United States Patent
Burns et al.

(10) Patent No.: US 8,992,840 B2
(45) Date of Patent: Mar. 31, 2015

(54) MULTIPLE COMPONENT FEED METHODS AND SYSTEMS

(75) Inventors: David H. Burns, Houston, TX (US); Donald W. Verser, Houston, TX (US); Elizabeth A. Benham, Spring, TX (US); Max P. McDaniel, Bartlesville, OK (US); John D. Hottovy, Humble, TX (US); Dale A. Zellers, Bartlesville, OK (US); Penny A. Zellers, legal representative, Bartlesville, OK (US); Clay K Thurman, Bartlesville, OK (US); David A. Lockman, Pawhuska, OK (US); John O. Lawmaster, Bartlesville, OK (US); Matthew T. Haberly, Copan, OK (US); Thomas H. Smith, Dewey, OK (US); Jerry T. Lanier, Bartlesville, OK (US); Matthew G. Thorn, Mason, OH (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 1231 days.

(21) Appl. No.: 12/584,388

(22) Filed: Sep. 8, 2009

(65) Prior Publication Data

US 2009/0326168 A1 Dec. 31, 2009

Related U.S. Application Data

(62) Division of application No. 11/241,016, filed on Sep. 30, 2005, now Pat. No. 7,615,596.

(51) Int. Cl.
*B01J 19/00* (2006.01)
*C08F 2/00* (2006.01)
(Continued)

(52) U.S. Cl.
CPC .............. *G05B 13/048* (2013.01); *B01J 8/0015* (2013.01); *B01J 19/0006* (2013.01); *B01J 19/0033* (2013.01); *B01J 19/1837* (2013.01); *B01J 19/2435* (2013.01); *C08F 2/00* (2013.01); *C08F 10/00* (2013.01); *G05B 13/042* (2013.01);
(Continued)

(58) Field of Classification Search
None
See application file for complete search history.

(56) References Cited

U.S. PATENT DOCUMENTS 3,130,187 A * 4/1964 Tolin et al. .................. 526/59
3,475,392 A * 10/1969 McCoy et al. .............. 526/60
(Continued)

FOREIGN PATENT DOCUMENTS

EP 0432555 6/1991
EP 1437174 7/2004
(Continued)

OTHER PUBLICATIONS

International Search Report for Application No. PCT/US2006/036651, dated Aug. 8, 2007.

*Primary Examiner* — Jennifer A Leung
(74) *Attorney, Agent, or Firm* — Fletcher Yoder, P.C.

(57) ABSTRACT

Multiple components are selected, conveyed, and measured in a polymerization system. A control system adjusts the system variables to the desired values. Portions of the components can be fed to a pre-contactor before introduction into the polymerization reactor. The catalyst component concentrations and residence times are tightly controlled in the pre-contactor to affect product properties. The pre-contactor can be a single or multiple combinations of a CSTR or plug flow pre-contactors.

23 Claims, 4 Drawing Sheets

Reactor System
101

(51) Int. Cl.
  *G05B 13/04* (2006.01)
  *B01J 8/00* (2006.01)
  *B01J 19/18* (2006.01)
  *B01J 19/24* (2006.01)
  *C08F 10/00* (2006.01)

(52) U.S. Cl.
  CPC . *B01J2219/00038* (2013.01); *B01J 2219/0004* (2013.01); *B01J 2219/00164* (2013.01); *B01J 2219/00184* (2013.01); *B01J 2219/00186* (2013.01); *B01J 2219/002* (2013.01); *B01J 2219/00218* (2013.01); *B01J 2219/00231* (2013.01)
  USPC ......... 422/131; 422/105; 422/132; 422/134; 700/269

(56) References Cited

U.S. PATENT DOCUMENTS

| | | | |
|---|---|---|---|
| 3,903,202 A * | 9/1975 | Carter et al. | 525/53 |
| 4,595,566 A * | 6/1986 | Byrd et al. | 422/134 |
| 6,046,286 A * | 4/2000 | Kreilein et al. | 526/88 |
| 6,300,271 B1 * | 10/2001 | McDaniel et al. | 502/104 |
| 6,355,594 B1 | 3/2002 | McDaniel et al. | |
| 6,395,666 B1 | 5/2002 | McDaniel et al. | |
| 6,524,987 B1 | 2/2003 | McDaniel et al. | |
| 6,548,441 B1 | 4/2003 | McDaniel et al. | |
| 6,548,442 B1 | 4/2003 | McDaniel et al. | |
| 6,576,583 B1 | 6/2003 | McDaniel et al. | |
| 6,605,675 B2 | 8/2003 | Mawson et al. | |
| 6,613,712 B1 | 9/2003 | McDaniel et al. | |
| 6,613,852 B2 | 9/2003 | McDaniel et al. | |
| 6,632,894 B1 | 10/2003 | McDaniel et al. | |
| 6,653,416 B2 | 11/2003 | McDaniel et al. | |
| 6,723,804 B1 | 4/2004 | Battiste | |
| 6,750,302 B1 | 6/2004 | McDaniel et al. | |
| 6,838,533 B2 | 1/2005 | McDaniel et al. | |
| 6,858,687 B2 | 2/2005 | McDaniel et al. | |
| 6,878,785 B2 | 4/2005 | McDaniel et al. | |
| 2003/0114608 A1 * | 6/2003 | Tharappel et al. | 526/64 |
| 2003/0162651 A1 | 8/2003 | McDaniel et al. | |
| 2003/0207756 A1 | 11/2003 | McDaniel et al. | |
| 2004/0014909 A1 | 1/2004 | McDaniel et al. | |
| 2004/0024147 A1 | 2/2004 | McDaniel et al. | |
| 2004/0180780 A1 | 9/2004 | McDaniel et al. | |
| 2005/0137366 A1 | 6/2005 | McDaniel et al. | |

FOREIGN PATENT DOCUMENTS

| | | |
|---|---|---|
| GB | 1398034 | 6/1975 |
| WO | WO 01/40330 | 6/2001 |
| WO | WO 02/46246 | 6/2002 |
| WO | WO 2004/026455 | 4/2004 |
| WO | WO 2005/068516 | 7/2005 |

\* cited by examiner

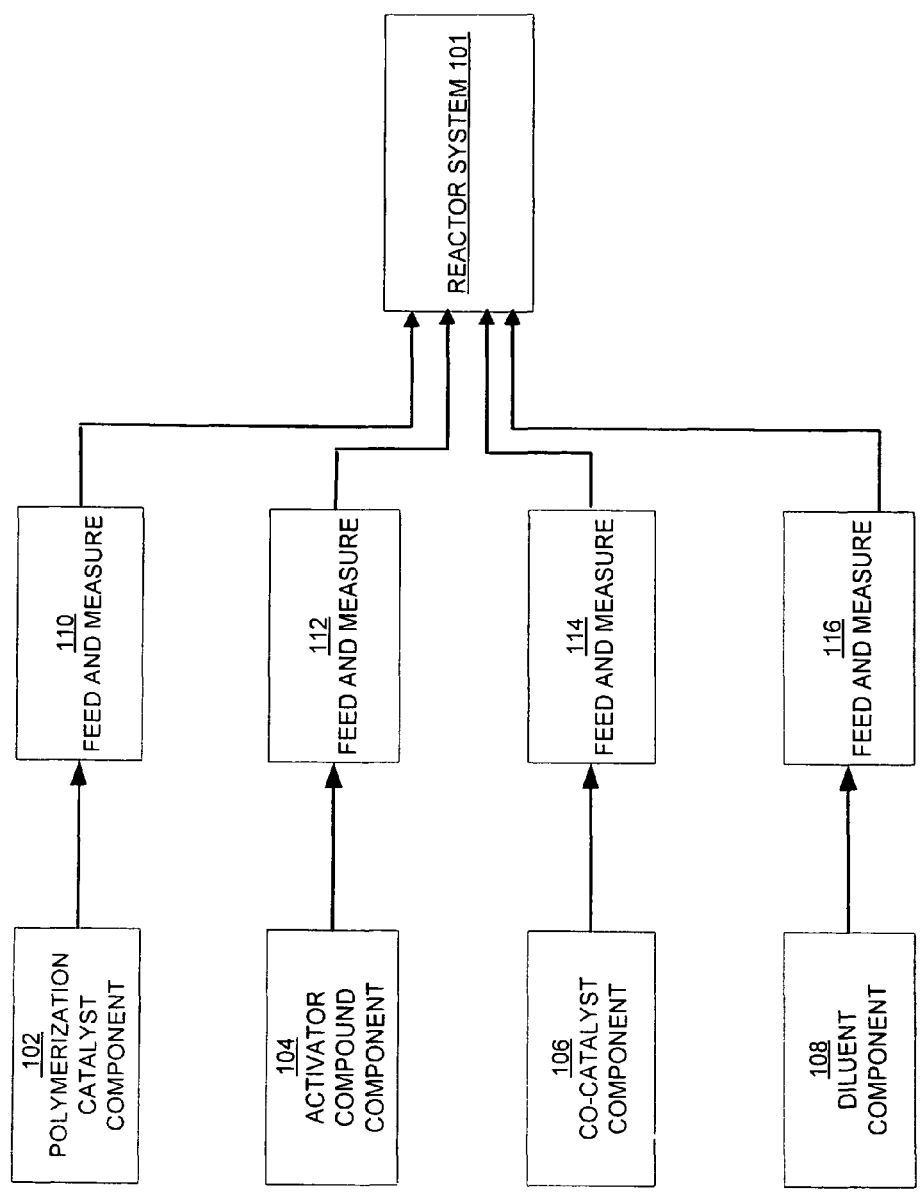
Figure 1 - Polymerization System 100

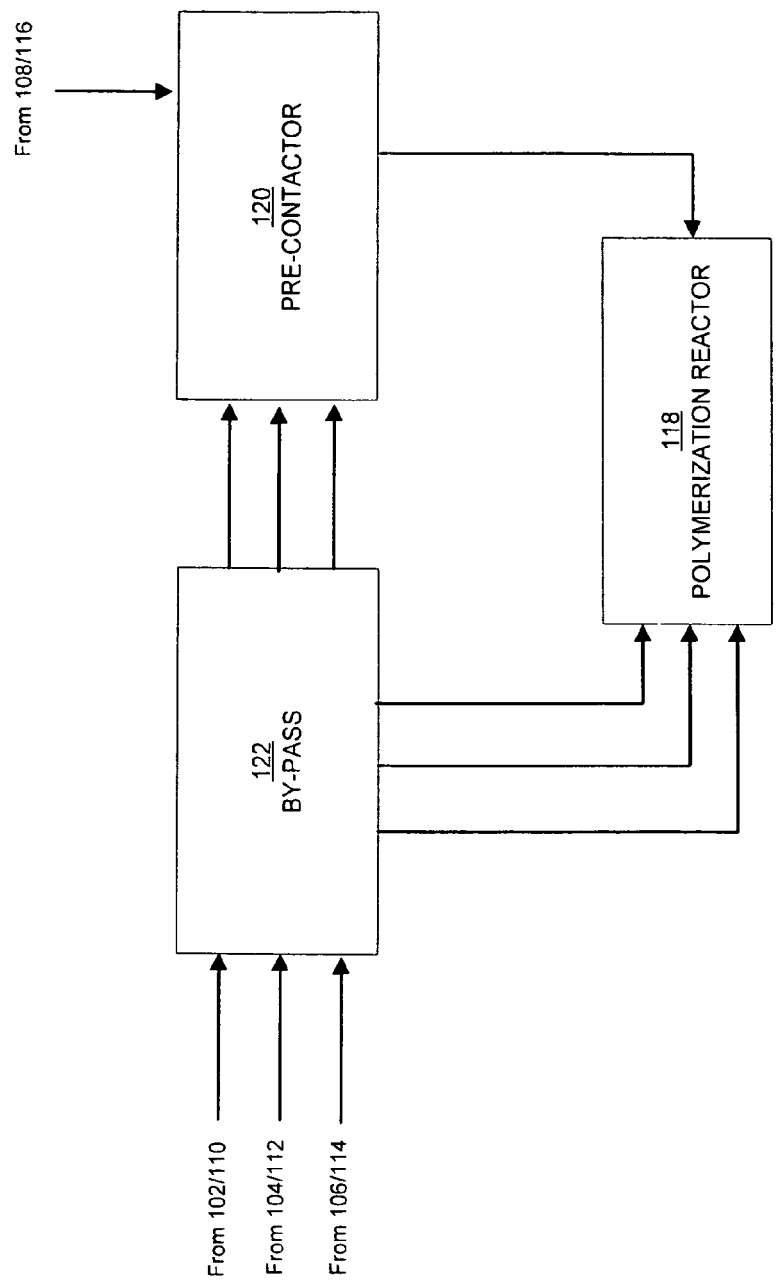
Figure 2 - Reactor System 101

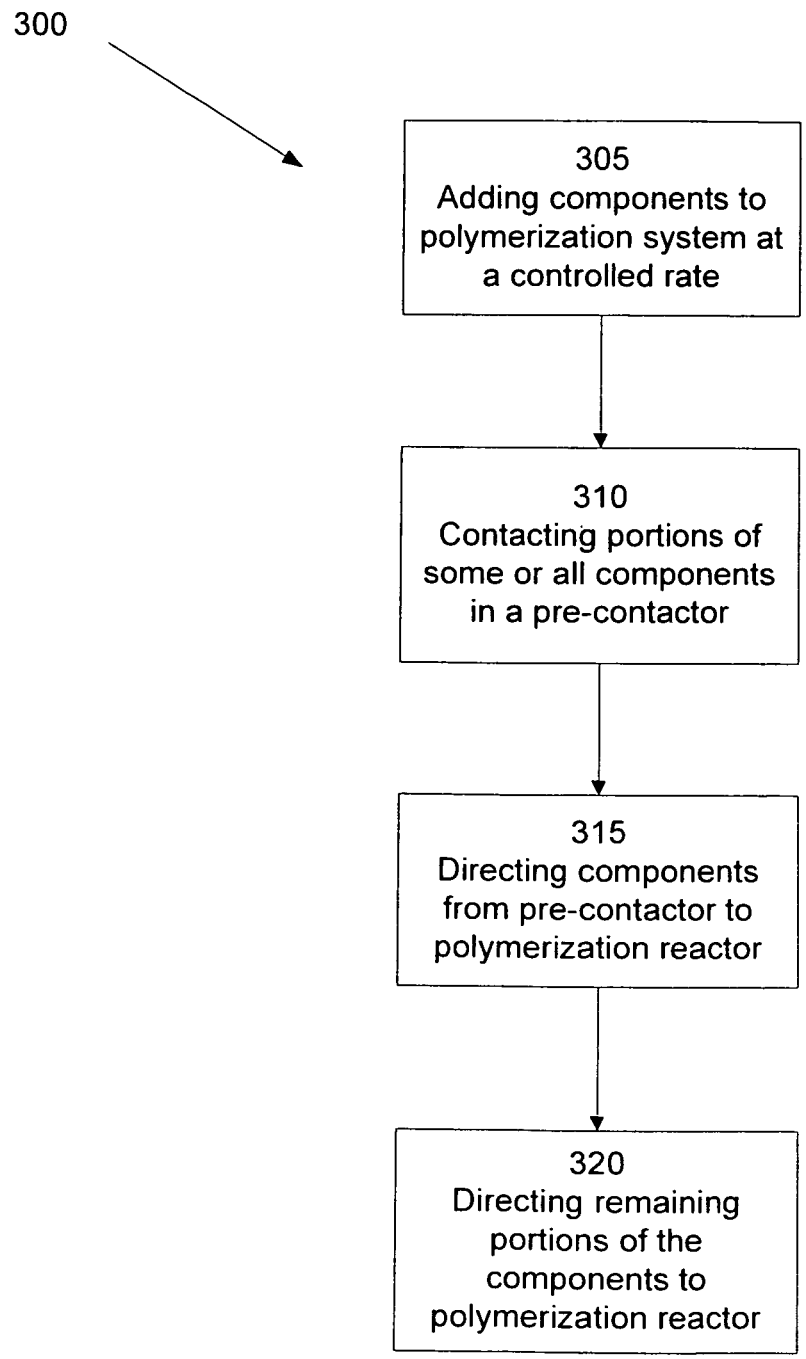
Figure 3  Method 300

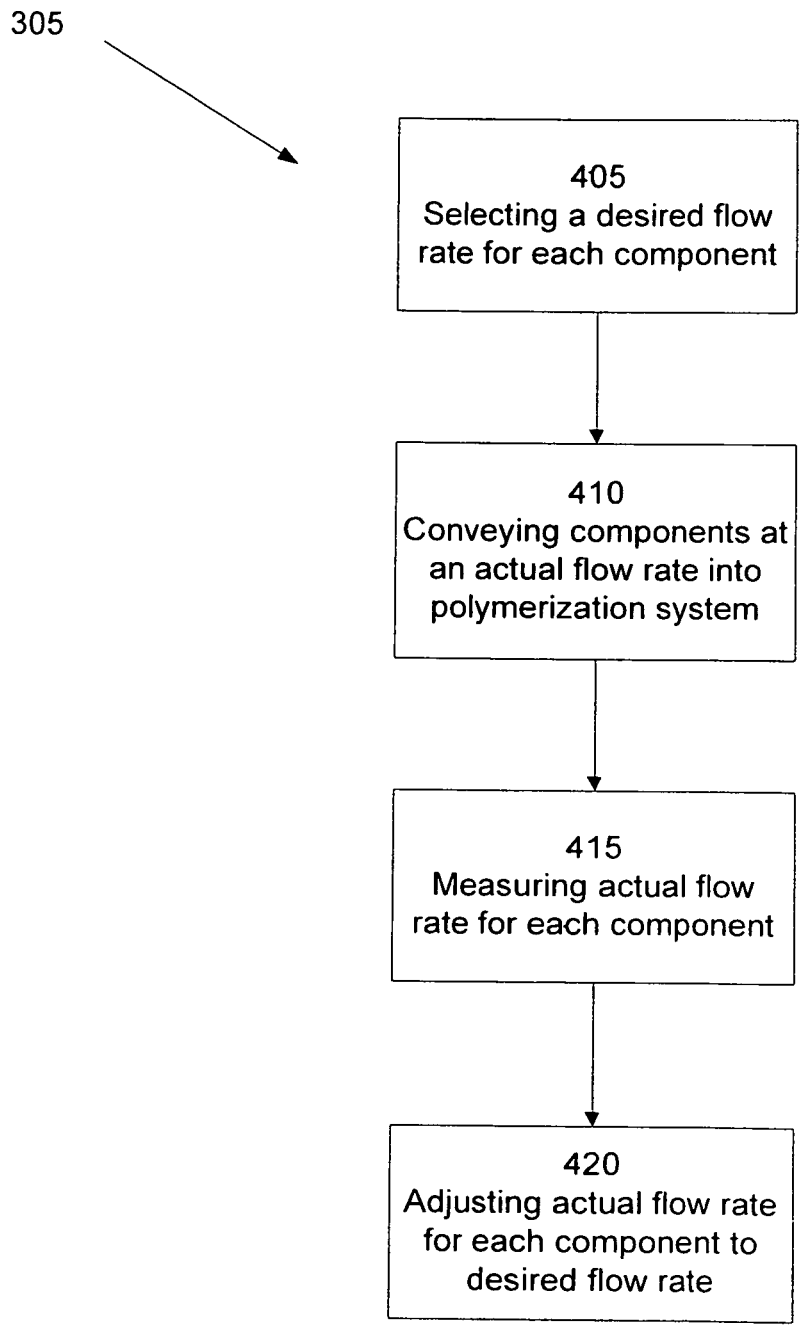
Figure 4  Method 305

MULTIPLE COMPONENT FEED METHODS AND SYSTEMS

This application is a divisional of U.S. patent application Ser. No. 11/241,016, filed Sep. 30, 2005, which is herein incorporated by reference in its entirety.

TECHNICAL FIELD

This application relates to the methods and systems for the introduction of multiple components to a polymerization system.

BACKGROUND OF THE INVENTION

In typical polyolefin reaction processes, various components are added to a polymerization system to begin the polyolefin reaction process. These various components can include olefin feed components, diluent components, and catalyst components.

Upon introduction of the olefin feed components, the diluent components, and the catalyst components into a polymerization reactor, the polymerization reaction process begins. The polymerization reaction takes place within the polymerization reactor under a set of reaction conditions. The reaction conditions can include reaction temperature, reaction pressure, reactor residence time, and concentrations of the various components within the reactor, such as reactor solids, ethylene, hexene, hydrogen, co-catalysts, antistatic agents, electron donors, and inerts, such as ethane and propane.

It is often desirable to produce polyolefins having certain physical and mechanical properties, depending upon the application and market in which the polyolefin is to be used. These markets can include, for example, blow molding, injection molding, rotational molding, film, drums, and pipe. Some physical properties that can be important, depending on the product requirement and application, are molecular weight, molecular weight distribution, density, crystallinity, and rheology. Some mechanical properties that can be important, depending on the product requirement and application, are modulus, tensile properties, impact properties, stress relaxation, creep, and elongation. However, obtaining polyolefins with consistent desired properties is difficult to accomplish. The properties of the polyolefin produced within the polymerization system can be affected by the reaction conditions under which the reaction takes place, including reactor concentrations. Consequently, specific control of the various components introduced into the reactor, including catalyst components, must often be precisely measured and monitored.

The rate at which catalyst components are added to the reactor can affect the physical and mechanical properties of the polyolefin being produced within the reactor, and therefore is an important factor to control and monitor. Conventional methods of adding catalyst components to reactor systems may introduce possible error into the reaction process, resulting in the production of off-specification product. For example, in at least one conventional polyolefin reaction system, catalyst components are fed to the polymerization reactor using ball check feeders. Ball check feeders typically include a rotating cylinder having a cavity on one side of the cylinder. The cavity fills with catalyst components and empties the catalyst components into the reactor after each 180° rotation of the cylinder. However, the amount of catalyst component that fills the cavity during each rotation of the cylinder may be inconsistent, resulting in inconsistent feed of catalyst components to the reactor. Inconsistent feed of catalyst components (as well as other components) to the reactor can cause inconsistent operation and control of the polymerization reaction process, resulting in highly variable production rates and production of product outside the desired specification limits.

Despite existing systems and methods to control the feed of catalyst and polymer components to polymerization systems, a need exists for improved systems and methods for controlling the introduction of multiple components to a polymerization reactor. Further, a need also exists for improved systems and methods for combining multiple components in a polymerization system. Yet another need exists for improved systems and methods of feed control for a catalyst component in a polymerization process. Another need exists for improved systems and methods to produce a polymer.

SUMMARY OF INVENTION

In view of the foregoing, an embodiment of the present invention provides a method for the introduction of multiple components into a polymerization system. The method of introducing the multiple components includes adding at least one polymerization catalyst component, at least one activator compound component, and at least one co-catalyst component into the polymerization system at a controlled rate. Portions of some or all of the components are contacted in at least one pre-contactor and then directed from the pre-contactor to at least one polymerization reactor. Remaining portions of the components that were not sent to the pre-contactor are also directed to the at least one polymerization reactor. The remaining portions of the components bypass the pre-contactor.

In an aspect, the step of adding the components into the polymerization system at a controlled rate further includes selecting a desired flow rate for each component and conveying the components into the polymerization system at an actual flow rate. The actual flow rate for each component is then measured and adjusted to substantially equal the desired flow rate.

In another embodiment of the present invention, a method for the introduction of multiple components into a polymerization system is provided that includes adding at least one polymerization metallocene solution component, at least one treated solid oxide compound component, and at least one aluminum alkyl component into the polymerization system at a controlled rate. Portions of some or all of the components are contacted in at least one plug flow pre-contactor and then directed to at least one polymerization reactor. Remaining portions of the components are also directed to at least one polymerization reactor. The remaining portions of the components bypass the pre-contactor.

In an aspect, the step of adding the components into the polymerization system at a controlled rate further includes selecting a desired flow rate for each component and conveying the components into the polymerization system at an actual flow rate. The actual flow rate for each component is then measured and adjusted to substantially equal the desired flow rate.

In another embodiment of the present invention, a system for introduction of multiple components into a polymerization system is provided that includes means for adding at least one polymerization catalyst component, at least one activator compound component, and at least one co-catalyst component into the polymerization system at a controlled rate. The system also includes a means for contacting portions of some or all of the components in at least one pre-contactor and a means for directing output from the pre-contactor to at least one polymerization reactor. The system further includes a means for directing remaining portions of the components that were not sent to the pre-contactor to the at least one polymerization reactor. The means for adding the components into the polymerization system at a controlled rate further include a means for selecting a desired flow rate for each component; a means for conveying the components into the polymerization system at an actual flow rate; a means for measuring the actual flow rate for each component; and a means for adjusting the actual flow rate for each component to substantially equal the desired flow rate.

In another embodiment of the present invention, a system for introduction of multiple components into a polymerization system is provided. The system for introducing multiple components includes a means for adding at least one polymerization metallocene solution component, at least one treated solid oxide compound component, and at least one aluminum alkyl component into the polymerization system at a controlled rate. The means for adding the components can be used to individually add each component or can be used to add more than one component at a time to the polymerization system. The system also includes a means for contacting portions of some or all of the components in at least one plug flow pre-contactor and means for directing output from the pre-contactor to at least one polymerization reactor that bypass the pre-contactor. The system further includes a means for directing remaining portions of the components that were not sent to the pre-contactor to the at least one polymerization reactor.

In an aspect, the means for adding the components into the polymerization system at a controlled rate further include a means for selecting a desired flow rate for each component and a means for conveying the components into the polymerization system at an actual flow rate. The system further includes a means for measuring and adjusting the actual flow rate for each component to substantially equal the desired flow rate.

In another embodiment of the present invention, a tangible, machine-readable media is provided that includes code adapted to control the concentration of at least one catalyst component in a mixture in a pre-contactor vessel to form a polyolefin in a polymerization reactor and code adapted to read measured values of concentrations and residence times in the pre-contactor vessel. The machine-readable media also includes code adapted to determine the amount of at least one catalyst component to add to the vessel based on the measured values and code adapted to determine the amount of any catalyst component to bypass the pre-contactor vessel.

BRIEF DESCRIPTION OF THE DRAWINGS

FIG. 1 illustrates an exemplary polymerization system for introducing multiple reaction components into a reactor system in accordance with various aspects of the invention;

FIG. 2 illustrates an exemplary embodiment of the reactor system of FIG. 1;

FIG. 3 illustrates an exemplary method for introducing multiple components into the polymerization system of FIG. 1; and FIG. 4 illustrates an exemplary method for adding multiple components to the polymerization system at a controlled rate within the method of FIG. 3.

DETAILED DESCRIPTION OF EMBODIMENTS

During the production of polyolefins, various components are typically mixed together or reacted with each other within a reactor vessel. The various components can be separately added directly to the reactor, or some or all of the various components can be mixed by another device or process prior to being added to the reactor. In general, the invention provides systems and methods for controlling the introduction of multiple components to a polymerization reactor. In an aspect of the invention, a method facilitates controlling the introduction of multiple components to the polymerization reactor. In another aspect of the invention, a method facilitates combining multiple components to the polymerization reactor. Another aspect of the invention facilitates a method of feed control for a catalyst component in the polymerization process. Yet another aspect of the invention facilitates a system for producing a polyolefin.

Turning now to FIGS. 1 and 2, an exemplary embodiment of a polymerization system 100 includes a reactor system 101, a polymerization catalyst component 102, an activator compound component 104, a co-catalyst component 106, and a diluent component 108. The polymerization system 100 of this invention also includes a means for feed and measure 110 for the polymerization catalyst component 102; a means for feed and measure 112 for the activator compound component 104; a means for feed and measure 114 for the co-catalyst component 106; and a means for feed and measure 116 for the diluent component 108. The operability of the polymerization process is improved by measuring some or all of the catalyst components that are fed to the polymerization reactor 118. Precise measuring of the catalyst components also minimizes the potential for catalyst leakage or misdirected catalyst flow.

In an aspect, the means for feed and measure 110 for the polymerization catalyst component 102 include a means for adding the polymerization catalyst component 102 to the polymerization system 100 at a controlled rate. In another aspect, the means for feed and measure 110 for the polymerization catalyst component 102 can include a polymerization catalyst addition system configured to add the polymerization catalyst component 102 to the polymerization system 100 at a controlled rate.

In an aspect, the means for feed and measure 112 for the activator compound component 104 include a means for adding the activator compound component 104 to the polymerization system 100 at a controlled rate. In another aspect, the means for feed and measure 112 for the activator compound component 104 can include an activator compound addition system configured to add the activator compound component 104 to the polymerization system 100 at a controlled rate.

In an aspect, the means for feed and measure 114 for the co-catalyst component 106 include a means for adding the co-catalyst component 106 to the polymerization system 100 at a controlled rate. In another aspect, the means for feed and measure 114 for the co-catalyst component 106 can include a co-catalyst addition system configured to add the co-catalyst component 106 to the polymerization system 100 at a controlled rate.

In an aspect, the means for feed and measure 116 for the diluent component 108 include a means for adding the diluent component 108 to the polymerization system 100 at a controlled rate. In another aspect, the means for feed and measure 116 for the diluent component 108 can include a diluent addition system configured to add the diluent component 108 to the polymerization system 100 at a controlled rate.

The reactor system 101 can be any reactor system suitable for carrying out a polymerization process to produce a desired polyolefin product. As shown in FIG. 2, the reactor system 101 of this invention includes a polymerization reactor 118, a pre-contactor 120, and a by-pass 122.

The polymerization reactor 118 can be any reactor unit in which a polymerization reaction can occur such as, for example, a continuous stirred tank reactor (CSTR), a slurry loop reactor, a batch reactor, a gas phase reactor, an autoclave reactor, a tubular reactor, a multi-zone reactor, a fluidized bed reactor, a fixed bed reactor, a stirred bed reactor, or a stirred fluidized bed reactor. In an embodiment, the polymerization reactor 118 is a slurry loop reactor. Other suitable types of reactors will be apparent to those of skill in the art and are to be considered within the scope of the present invention.

When a slurry loop reactor is used, the polymerization reactor 118 of this invention can be a loop of pipe having a nominal outside diameter of between 12 and 36 inches. The polymerization reactor 118 can be oriented horizontally or vertically. The polymerization reactor 118 can have any number of reactor legs, such as between 2 and 16 legs; alternatively, between 2 and 12 legs; alternatively, between 2 and 8 legs; or alternatively, between 2 and 6 legs. The polymerization reactor 118 volume is not limited by this invention. The polymerization reactor 118 volumes can range from about 1,000 gallons to about 80,000 gallons. The contents within the polymerization reactor 118 are circulated throughout the polymerization reactor 118 in the form of a slurry. The slurry includes one or more of the following: a hydrocarbon, a diluent, a catalyst, and a polymer. The slurry can be circulated by an urging means (not shown). The urging means can be any means suitable for circulating the slurry throughout the reactor 118 such as, for example, an axial flow pump, a mixed flow pump, a centrifugal pump, a positive displacement pump, or any combination thereof. In an embodiment, the urging means is one or more axial flow pumps. Homopolymers and co-polymers of polyolefins, such as polyethylene and polypropylene, can be produced in the polymerization reactor 118. Variables important to the operation of the polymerization reactor 118 can be monitored and controlled by an interface. Common interfaces include DCS (distributed control system), PLC (programmable logic controller), and a Neural Network. Variables important to reactor operation include production rates, catalyst feed rates, temperatures, pressures, flow rates, concentrations, and the like. For example, residence time in the polymerization reactor 118 can be limited to a predefined time, and the solids concentration for each component can be maintained. Operating conditions can include, but are not limited to, residence time, temperature, pressure, chemicals concentration, solids concentration, and combinations thereof. Maintaining relatively high reactor solids concentration and increasing polyethylene production because of the consistent catalyst feeding can improve the operation of the polymerization reactor 118. For example, residence time can be controlled to within a range of approximately 20 minutes to 3 hours, temperature can be controlled to within a range of approximately 150-230° F. (66-110° C.), pressure can be controlled to within a range of approximately 500-800 pounds per square inch (34-55 bar), and solids concentration can be controlled to within a range of approximately 30-75 weight %. The polymerization reactor 118, which can be a slurry loop reactor, is described in greater detail in U.S. Pat. Nos. 6,420,497; 6,239,235; 5,565,175; 5,565,174; 5,455,314; and 4,613,484, the disclosures of which are herein incorporated in their entirety by reference.

As depicted in FIG. 2, the reactor system 101 further includes the pre-contactor 120. The pre-contactor 120 is designed to contact one or more selected components prior to introducing the selected components into the polymerization reactor 118. The selected components that are introduced to the pre-contactor 120 are chosen from the polymerization catalyst component 102, the activator compound component 104, the co-catalyst component 106, the diluent component 108, and combinations thereof and can include any amount of any of these components 102, 104, 106, and 108.

The pre-contactor 120 can be any type of vessel suitable for contacting the one or more selected components 102, 104, 106, and 108 prior to introducing the selected components 102, 104, 106, and 108 into the polymerization reactor 118, such as, for example, a continuous stirred tank reactor (CSTR) or a plug flow reactor. The pre-contactor 120 can contain an agitation means (not shown) for mixing the one or more selected components 102, 104, 106, and 108 together or otherwise agitating the one or more selected components 102, 104, 106, and 108. The agitation means can include, but is not limited to, one or more impellers, a rotating element, a mixer, a vibrating device, or any combination thereof.

In an embodiment of the present invention, the pre-contactor 120 is a continuous stirred tank reactor (CSTR). When the pre-contactor 120 is a CSTR, the components are mixed with the assistance of the agitation means. The contents have a residence time distribution (rtd) within the pre-contactor 120. For example, in a typical single CSTR, the decay rate is about 60 to about 70% complete at one residence time, about 80 to about 90% complete at two residence times, and about 92 to about 98% complete at three residence times. In other words, about 60 to about 70% of the contents in the pre-contactor 120 remain for +/− one residence time; about 80 to about 90% remain for +/− two residence times; and about 92 to about 98% for +/− three residence times. Alternatively, the decay rate can be about 62 to about 65% at one residence time, about 85 to about 87% for two residence times, and about 94 to about 96% at three residence times. Multiple CSTRs can give a narrower rtd. For example, infinite CSTRs in series simulate the rtd as in a batch reactor. In an alternative embodiment, the pre-contactor 120 is a plug flow type vessel. The particles within the plug flow type reactor 120 all have approximately the same residence time with little or no lateral mixing. In yet another embodiment, the pre-contactor 120 includes at least one plug flow type vessel and at least one CSTR arranged in series. One skilled in the art will recognize other arrangements are possible with single or multiple CSTRs and plug flow reactors, and are included in the scope of the present invention.

In some embodiments, the polymerization system 100 includes at least two polymerization reactors 118. In an aspect, the polymerization reactors 118 are arranged in a series configuration. In another aspect, the polymerization reactors 118 are arranged in a parallel configuration.

Operating conditions for the pre-contactor 120 can be monitored and controlled. Predefined amounts of components 102, 104, 106, and 108 introduced into the pre-contactor 120 can be monitored and controlled prior to introduction into the pre-contactor 120, and any mixing or agitation of the components 102, 104, 106, and 108 can be controlled within a range of selected conditions. Factors that can be controlled in the pre-contactor 120 include residence time, temperature, pressure, concentration, and combinations thereof of the one or more selected components 102, 104, 106, and 108. Control of these factors can affect the properties of the polyolefin later produced within the polymerization reactor 118.

Residence time, which can also be referred to as contact time, within the pre-contactor 120 can be controlled, for example, by controlling the rate of flow of the diluent component 108 into the pre-contactor 120. The residence time within the pre-contactor 120 can be any amount of time suitable for thoroughly contacting the one or more selected components, such as, for example, from about 1 second to about several hours. In some embodiments, the residence time ranges from about 1 second to about 300 minutes; alternatively, from about 1 second to 200 minutes; alternatively, from about 1 second to about 100 minutes; alternatively, from about 1 second to about 60 minutes; or alternatively, from about 1 second to about 30 minutes.

The residence time can be adjusted prior to introduction of the components 102, 104, 106, and 108 to the polymerization reactor 118 in response to product performance and reactor operability. Control of the polymerization reactor 118 and the quality of the polyolefin product can be improved as a result of the increased precision in measurement and control of catalyst feed to the polymerization reactor 118. The components 102, 104, 106, and 108 can completely or partially bypass the pre-contactor 120 to increase precision and control of the catalyst feed. In other cases superior catalyst and product performance can be achieved by contacting some or all of the components 102, 104, 106, and 108 prior to introduction into the polymerization reactor 118 as previously described.

When a plug flow pre-contactor is used, the streams entering the pre-contactor 120 can enter at different locations in the pre-contactor 120. Some components 102, 104, 106, and 108 can enter at the front or beginning and others can be spaced throughout the length of the pre-contactor 120. By staging the components 102, 104, 106, and 108 throughout the plug flow pre-contactor 120, the residence time of each component 102, 104, 106, and 108 can be tailored for product performance. As an example, one method can be to add the one or multiple polymerization catalyst components 102 at the entrance of the plug flow pre-contactor 120, add the activator compound component 104, the co-catalyst component 106, and combinations thereof downstream of the entrance. Polymerization catalyst components 102, activator compound components 104, and co-catalyst components 106 can remain in the pre-contactor 120 in step 310 from less than one second to several hours before contacting the other components 102, 104, 106, and 108. As another example, the polymerization catalyst components 102 can also be staged with the activator compound component 104 followed by the polymerization catalyst component 102, followed by the co-catalyst component 106, followed by the polymerization catalyst component 102, and then followed by the same or different co-catalyst component 106.

In some embodiments, the system 100 can have up to 6 different polymerization catalyst components 102 staged with different co-catalyst compounds 106 downstream of each of the polymerization catalyst components 102. Alternatively, the system 100 can have up to four different polymerization catalyst components 102. Alternatively, the system can have up to three different polymerization catalyst components 102. Those skilled in the art will recognize other applications of the invention in accordance with various embodiments of the invention. For example, the pre-contactor 120 can be a CSTR, a plug flow, two or more CSTRs in series, CSTR followed by a plug flow, or any other combination.

Many methods to control the temperature in the pre-contactor 120 are possible, including by direct and indirect heating. Temperature control can be an important factor in chemical reactions. Because of the different reaction rates, paths, and diffusivities that vary with reaction temperature, the reaction temperature needs to be held relatively constant to consistently produce reaction products having similar properties. Suitable means of controlling the pre-contactor 120 temperature will be apparent to those of ordinary skill in the art and are to be considered within the scope of the present invention.

The concentration of components 102, 104, 106, and 108 in the pre-contactor 120 can be varied and adjusted to affect the reaction, the product quality, or the reactor operation. The reaction rate can be affected by having a higher or lower concentration of one or more of the components 102, 104, 106, and 108 in the pre-contactor 120. A certain ratio of components 102, 104, 106, and 108 in the pre-contactor 120 can give optimal catalyst performance, product quality, and reactor operability. Furthermore, a ratio of one or more of the components 102, 104, 106, and 108 in the pre-contactor 120 in relation to the feed directly to the reactor 118 can affect the reactor operability. The reaction extent can be affected by having a higher or lower concentration of one or more of the components 102, 104, 106, and 108 in the pre-contactor 120. The components efficiencies can be affected by having a higher or lower concentration of some or all of the components 102, 104, 106, and 108 in the pre-contactor 120.

As also shown in FIG. 2, the reactor system 101 further includes a pre-contactor bypass 122. The pre-contactor bypass 122 is designed to direct some or all of the components 102, 104, and 106 directly to the polymerization reactor 118, without first being sent to the pre-contactor 120. The pre-contactor bypass 122 allows for the contact of some or all of each component 102, 104, and 106 to take place in the polymerization reactor 118 instead of in the pre-contactor 120. In an aspect, the components 102, 104, and 106 can be added individually to the polymerization reactor 118; or alternatively, one of more of the components 102, 104, and 106 can be combined prior to adding the components 102, 104, and 106 to the polymerization reactor 118. The properties of the polyolefin product and catalyst performance can be controlled by adjusting the amounts of components 102, 104, and 106 directed to the pre-contactor 120 versus the amounts of components 102, 104, and 106 sent directly to the polymerization reactor 118 via the pre-contactor bypass 122. The output from the pre-contactor 120 can have different properties, such as a particular ratio of components, than the components 102, 104, and 106 that are sent directly to the polymerization reactor 118. The properties that can be affected by sending the components 102, 104, and 106 to the pre-contactor 120 are described herein. The pre-contactor bypass 122 can be any vessel or device suitable for directing the flow of some or all of the components 102, 104, and 106 directly to the polymerization reactor 118. In an embodiment, the pre-contactor bypass 122 is pipe or tubing.

The means for feed and control 110, 112, 114, and 116 measure and control the rates at which the components 102, 104, 106, and 108 are introduced into the polymerization system 100. The means for feed and control 110, 112, 114, and 116 can be any device suitable for precisely measuring and controlling the rates at which the components 102, 104, 106, and 108 are introduced into the polymerization system 100, such as, for example, a flow meter, a pump, or a combination thereof. In an embodiment, the means for feed and control 102, 104, 106, and 108 are a combination flow meter and pump. The pump can be any pump suitable for precisely measuring and controlling the rates at which the components 102, 104, 106, and 108 are introduced into the polymerization system 100. In some embodiments, the pump is a positive displacement-type pump. In some embodiments, the pump can be a syringe pump. The flow meter can be any flow meter suitable for precisely measuring and controlling the rates at which the components 102, 104, 106, and 108 are introduced into the polymerization system 100, such as, for example, a thermal mass flow meter or a volumetric flow meter such as an orifice-type, diaphragm-type, or a level-type meter. In some embodiments, the flow meter is a mass flow meter. More specifically, in some embodiments, the flow meter is a coriolis-type meter adapted to measure a variety of flow types from a positive displacement-type pump. Any combination of means for feed and control 110, 112, 114, and 116 can be used for each component 102, 104, 106, and 108, and it is not necessary that the same type of means for feed and control is used for every component 102, 104, 106, and 108. For example, means for feed and control 110 for the catalyst component 102 can be a mass flow meter, while the means for feed and control 112 for the activator compound component 104 can be a pump.

The polymerization catalyst component 102 is provided to the polymerization system 100 as the active compound for a polymerization catalyst. The polymerization catalyst component 102 can be any catalyst component suitable for olefin polymerization, such as, for example, a chrome oxide catalyst, a chrome silyl catalyst, a Zeigler-Natta catalyst, a metallocene catalyst, a phenoxyimine catalyst, and a phosphated aluminum catalyst. Additionally, the composition of the catalyst component 102 can include an additional compound such as titanium. In an exemplary embodiment, the polymerization catalyst component 102 is a metallocene solution. In some aspects, the polymerization catalyst component 102 is a metallocene solution having the following general equation:

$$(X(1))(X(2))(X(3))(X(4))M(1);$$

In this equation, M(1) is selected from the group consisting of titanium, zirconium, and hafnium. (X(1)) is independently selected from the group consisting of cyclopentadienyl, indenyls, fluorenyls, substituted cyclopentadienyls, substituted indenyls, and substituted fluorenyls. Substituents on the substituted cyclopentadienyls, substituted indenyls, and substituted fluorenyls of (X(1)) are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, hydrogen, and combinations thereof. At least one substituent on (X(1)) can be a bridging group that connects (X(1)) and (X(2)) (X(3)) and (X(4)) are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, substituted organometallic groups, and combinations thereof. (X(2)) is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, substituted organometallic groups, and combinations thereof. Substituents on (X(2)) are selected from the group consisting of aliphatic groups, cyclic groups, combinations of aliphatic groups and cyclic groups, silyl groups, alkyl halide groups, halides, organometallic groups, phosphorus groups, nitrogen groups, silicon, phosphorus, boron, germanium, hydrogen, and combinations thereof. At least one substituent on (X(2)) can be a bridging group that connects (X(1)) and (X(2)).

Depending upon the desired properties of the polyolefin (e.g., polyethylene) to be produced within the polymerization reactor 118, any number of catalyst components 102 can be used within the system 100. In some embodiments, between one and six catalyst components 102 are utilized; alternatively, between one and four catalyst components 102 are utilized; and alternatively, between one and three catalyst components 102 are utilized.

The activator compound component 104 is provided to the polymerization system 100 for the activation, conversion, or reduction of the catalyst component 102 to the active state for polymerization. The activator compound component 104 can be any activator compound component suitable for activation, conversion, or reduction of the catalyst component 102 to the active state for polymerization, such as, for example, a treated solid oxide, borates and methyl alumina oxane. In an exemplary embodiment, the activator compound component 104 is a treated solid oxide. More particularly, in some embodiments, the activator compound component 104 is a super solid acid (SSA) initiator. Other suitable activator compound components 104 will be apparent to those of skill in the art and are to be considered within the scope of the present invention.

In another example, one component 102 or 104 can be impregnated with another component 102 or 104, or otherwise combined with another component 102 or 104, such as impregnating a polymerization catalyst component 102 with an activator compound component 104. In an exemplary embodiment, the metallocene component 102 can be impregnated with an activator compound component 104. For such instances, the combined components 102 and 104 can be referred to as a single component, and one or more of the impregnated components can be omitted from the description herein.

The co-catalyst component 106 is provided to the polymerization system 100 as an alkylator, electron donor, or for reduction of the catalyst component 102 or specifically as the active metal species of the catalyst component 102. The co-catalyst component 106 can be any co-catalyst component suitable as an alkylator, electron donor, or for reduction, such as, for example, trimethylaluminum, triethylaluminum (TEAl), tripropylaluminum, diethylaluminum ethoxide, tributylaluminum, diisobutylaluminum hydride, triisobutylaluminum hydride, triisobutylaluminum (TiBAl), trihexylaluminum, and diethylaluminum chloride. In an exemplary embodiment, the co-catalyst component 106 is TEAl or TiBAl. In an aspect, the co-catalyst component 106 can include at least one aluminum alkyl component. The polymerization system 100 can include any number of co-catalyst components 106. In some embodiments, the polymerization system 100 includes one or two co-catalyst components 106. The co-catalyst component 106 can also be a mixture of any of the different types of co-catalyst components set forth herein. For example, TEAl and TiBAl can both be added to the polymerization system 100 to act jointly as the co-catalyst component 106. The TEAl and TiBAl can be premixed, such as in the pre-contactor 120, and added to the polymerization reactor 118 together, or they can be fed directly to the polymerization reactor 118 individually as separate feed streams, or a combination thereof.

The diluent component 108 is provided to the system 100 to control the concentration of the various components 102, 104, and 106 within the system 100. For example, the concentrations of the various components 102, 104, 106 can be increased by decreasing the volume of the diluent component 108 added to the system 100. Similarly, the concentrations of the various components 102, 104, 106 can be decreased by increasing the volume of the diluent component 108 added to the system 100. The diluent component 108 can be any diluent component suitable for use in the reactor system 100, such as, for example, propane, isobutane, pentane, hexane, heptane, or octane. When the polymerization process is used to produce polypropylene, unreacted propylene can also be used as the diluent component 108. In an exemplary embodiment, the diluent component 108 is isobutane. Other suitable diluent components will be apparent to those of skill in the art and are to be considered within the scope of the present invention.

The diluent component 108 and each of the components 102, 104, 106 are delivered to the system 100 from a source. The source can be a run tank, storage tank, mix tank, flow pipe, mud pot, or another device, system or process that can deliver a suitable amount of the respective diluent component 108, polymerization catalyst component 102, or other component 104, 106 for producing a desirable property in the polyolefin to be produced by the system 100. For example, the diluent component 108 can be delivered to and stored in a run tank until called upon by the system 100. When the system 100 calls upon an amount of diluent component 108, an associated feed pump (not shown) can be activated to deliver the amount of diluent component 108 from the run tank to another part of the system 100. Those skilled in the art will recognize that a conventional run tank and feed pump combination can be used in accordance with various aspects of the invention to store and deliver sufficient amounts of the diluent component 108 and each of the components 102, 104, 106, when called upon by the system 100.

Referring now to FIGS. 3 and 4, a method 300 of introducing multiple components into the polymerization system 100 is provided. The method 300 includes adding the components 102, 104, 106, and 108 to the polymerization system 100 at a controlled rate (step 305) and contacting portions of some or all of the components 102, 104, 106, and 108 in the pre-contactor 120 (step 310). Portions of some or all of the components 102, 104, 106, and 108 from the pre-contactor 120 are then directed to the polymerization reactor 118 (step 315), along with directing any remaining portions of the components 102, 104, 106, and 108 that were not directed to the pre-contactor 120 in step 310.

In step 305 of method 300, the components 102, 104, 106, and 108 are added to the polymerization system 100 at a controlled rate. In an exemplary embodiment, the step 305 of adding the components 102, 104, 106, and 108 to the polymerization system 100 at a controlled rate includes adding the polymerization catalyst component 102, the activator compound component 104, the co-catalyst component 106, and the diluent component 108 at a controlled rate by the respective means for feed and control 110, 112, 114, and 116.

Turning now to FIG. 4, the step 305 of adding the components 102, 104, 106, and 108 to the polymerization system 100 at a controlled rate includes selecting a desired flow rate for each component 102, 104, 106, and 108 (step 405) and conveying the components 102, 104, 106, and 108 at an actual flow rate into the polymerization system 100 (step 410). An actual flow rate for each component 102, 104, 106, and 108 is measured (step 415) and adjusted for each component 102, 104, 106, and 108 to match the desired flow rate (step 420).

In step 405, the desired flow rates of the components 102, 104, 106, and 108 can affect the performance of the catalyst component 102, reactor 118 operability, and the physical and mechanical properties of the polyolefin product. Catalyst performance criteria that can be affected by the desired flow rates of the components 102, 104, 106, and 108 include, for example, activity, productivity, melt index potential, comonomer incorporation, and combinations thereof. Reactor operability criteria that can be affected by the desired flow rates of the components 102, 104, 106, and 108 include, for example, resistance to loss in heat transfer in the reactor, bulk density of the polyolefin in the reactor, solids formation, production rate, and combinations thereof. Physical properties of the polyolefin product that can be affected by the desired flow rates of the components 102, 104, 106, and 108 include, for example, shear responses and ratios at different shear rates that can include 0, 0.1, and 100/second; molecular weight; molecular weight distribution; density; crystallinity; and combinations thereof. Mechanical properties of the polyolefin product that can be affected by the desired flow rates of the components 102, 104, 106, and 108 include, for example, responses in creep tests, stress relaxation, tau eta, tensile at yield and break, elongation at yield and break, secant moduli that can include 0.1 and 2%, tensile (Youngs, elongation) modulus, storage and loss moduli, environmental stress crack growth, PENT, and combinations thereof.

The desired flow rates of the components 102, 104, 106, and 108 can be selected and set using any suitable technique for measuring flow rates. For example, the desired flow rates of the components 102, 104, 106, and 108 can be selected based upon ratios of the components 102, 104, 106, and 108; composition amounts; mass flow rates; or volumetric flow rates. The desired flow rates can be entered into a process control system, such as, for example, a Distributed Control System (DCS), a Programmable Logic Controller (PLC), or a Neural Network. These process control systems work to maintain the desired flow rate in an acceptable range.

In step 410, the components 102, 104, 106, and 108 are conveyed into the polymerization system 100 at an actual flow rate by the respective means for feed and control 110, 112, 114, and 116 at an actual flow rate for each component 102, 104, 106, and 108. As described previously, the means for feed and control 110, 112, 114, and 116 can include, for example, a flow meter, a pump, or a combination thereof.

In step 415, the actual flow rate of each component 102, 104, 106, and 108 into the polymerization system 100 can be measured by the respective means for feed and control 110, 112, 114, and 116 using any of the techniques previously described. In an embodiment, the flow rates of the components 102, 104, 106, and 108 are measured as mass flow rates. Various combinations of measurement are possible for the various components 102, 104, 106, and 108 depending upon the type of component, chemical compatibility of the component, and the desired quantity and flow rate of the component.

Finally, in step 420, the actual flow rate of each component 102, 104, 106, and 108 into the polymerization system 100 is adjusted as necessary to match the desired flow rate. The actual flow rate of each component 102, 104, 106, and 108 is compared to the desired flow rate as selected in step 405, and adjustments are made to the actual flow rate of each component 102, 104, 106, and 108 so that the actual flow rates and desired flow rates are substantially equal. In an embodiment, an operator selects set points for the desired flow rates of step 305, and a control system maintains the actual flow rates at rates that are substantially equal to the desired flow rates. The means for feed and control 110, 112, 114, and 116 provide precise fluid control measurement and flow control for the respective component 102, 104, 106, and 108 to be provided and introduced in method 300.

Each of the means for feed and control 110, 112, 114, and 116 in step 305 is adapted to receive a command, such as a user input or signal. The command includes instructions to operate or otherwise adjust the flow rate of the components 102, 104, 106, and 108 with the means for feed and control 110, 112, 114, and 116 in step 305. In some embodiments, a processor-based device (not shown) can be associated with a means for feed and control 110, 112, 114, and 116 to measure, select, determine or otherwise adjust predefined amounts, feed rates, and other operating properties of a component 102, 104, 106, and 108 being introduced, transmitted, or delivered by a means for feed and control 110, 112, 114, and 116 in step 305. For example, a feedback control device (not shown) can be installed downstream from a means for feed and control 110, 112, 114, and 116 in step 305 to monitor a feed rate of the component 102, 104, 106, and 108, and to transmit a command signal to the means for feed and control 110, 112, 114, and 116 in step 305 depending upon the feed rate of the particular component 102, 104, 106, and 108 to the reactor 118, the pre-contactor 120, or another portion of the method 300. A command signal can be sent to the means for feed and control 110, 112, 114, and 116 in step 305 for the first component 102, 104, 106, and 108 in response to the feed rate of the second component 102, 104, 106, and 108. Alternatively, the command signal can be sent to the means for feed and control 110, 112, 114, and 116 in step 305 for the first component 102, 104, 106, and 108 in response to the feed rate of the first component 102, 104, 106, and 108. Each means for feed and control 110, 112, 114, and 116 in step 305 can implement the command signal to adjust the feed rate of the respective component 102, 104, 106, and 108 accordingly.

Step 310 of method 300 includes optionally contacting some or all of the components 102, 104, 106, and 108 in a pre-contactor 120. Operating conditions for the pre-contactor 120 for step 310 can be monitored and controlled. Predefined amounts of components 102, 104, 106, and 108 introduced into the pre-contactor 120 in step 310 can be monitored and any mixing or agitation of the components 102, 104, 106, and 108 can be controlled within a range of selected conditions. The decision on the amount of each component 102, 104, 106, and 108 to send to the pre-contactor 120 can be decided by a PLC, DCS, or Neural Network program. A controller will work to maintain the desired flow in an acceptable range. In another aspect, a set fraction or amount of each component 102, 104, 106, and 108 sent to the pre-contactor 120 can be maintained. The bypassed amount that is not sent to the pre-contactor 120, if any, will be maintained within a set range by the control method, technique, or system, as described herein. Operating conditions within the pre-contactor 120 include, but are not limited to, residence time, temperature, pressure, component concentration, and combinations thereof. For example, residence time in the pre-contactor 120 in step 310 for a diluent component 108 such as isobutane can be limited to approximately 26 minutes, and the temperature within the pre-contactor 120 can be maintained at approximately 100° F. (38° C.). Other suitable operating conditions and combinations of conditions can be monitored and controlled, as will be apparent to those of skill in the art and are to be considered within the scope of the present invention.

Conventional methods and devices can be used to control the range of selected conditions. In the example above, the residence time in the pre-contactor 120 in step 310 can be controlled by adjusting the diluent 108 flow into the pre-contactor 120 in step 310. Furthermore, the temperature of the pre-contactor 120 in step 310 can be adjusted by controlling the amount of steam interacting with the pre-contactor 120 in step 310 by utilizing a jacket or other means.

Step 315 of method 300 includes directing the components 102, 104, 106, and 108 that were sent to the pre-contactor 120 in step 310 from the pre-contactor 120 to the polymerization reactor 118. Piping, tubing, or any other suitable transfer mechanism can be used to transfer the components 102, 104, 106, and 108 from the pre-contactor 120 to the polymerization reactor 118 in step 315. The piping, tubing, or other suitable transfer mechanism can be directed to a single or multiple locations in the polymerization reactor 118.

Step 320 in method 300 includes directing remaining portions of the components 102, 104, 106, and 108 to the polymerization reactor 118. The remaining portions of the components 102, 104, 106, and 108 that are sent directly to the polymerization reactor 118 are those not selected for introduction into the pre-contactor 120 in step 310. Thus, these components are transferred directly to the polymerization reactor 118 and bypass the steps 310 and 315 that involve the pre-contactor 120. The decision on the amount of each component 102, 104, 106, and 108 to bypass can be decided by a PLC, DCS, or Neural Network program. As described previously, the controller will work to maintain the desired flow in an acceptable range. In another aspect, a set fraction or amount of each component 102, 104, 106, and 108 bypassed can be maintained. The bypassed amount will be maintained within a set range by the control method, technique, or system.

When the components 102, 104, 106, and 108 have been transmitted to the polymerization reactor 118, either by step 315 or 320, the components 102, 104, 106, and 108 interact to begin the polymerization process for producing the desired polyolefin product. The polyolefin product can be, but is not limited to, homopolymers and copolymers of polyethylene and polypropylene. The systems and processes described herein can be used with other polyolefins, as will be apparent to those of skill in the art.

A feedback controller can be used to measure desired properties of the polymer and then automatically adjust the amount or ratio of components 102, 104, 106, and 108 going either to the pre-contactor 120 or the reactor 118, as described herein. The desired properties include, for example, molecular weight, molecular weight distribution, shear ratio or response, density, catalyst activity, rheology, melt index, or any physical or mechanical property deemed important to the process. Other properties of the polymers can be measured and used to control aspects related to the components 102, 104, 106, and 108, as will be apparent to those of skill in the art and are to be considered within the scope of the present invention.

Conventional methods and devices can be used to control the range of selected conditions in the polymerization reactor 118, as previously described. In the example above, the residence time can be controlled by adjusting the flow rates of the components 102, 104, 106, and 108 into the polymerization reactor 118. Furthermore, the solids concentrations of the polymerization reactor 118 can be adjusted by controlling the amounts of components 102, 104, 106, and 108 reacting within the polymerization reactor 118.

In another embodiment of the present invention, a tangible, machine-readable media is provided that includes code adapted to control the concentration of at least one catalyst component 102, 104, 106, 108 in a mixture in the pre-contactor 120 to form the polyolefin in the polymerization reactor 118 and code adapted to read measured values of concentrations and residence times in the pre-contactor 120. The machine-readable media also includes code adapted to determine the amount of at least one catalyst component 102, 104, 106, 108 to add to the pre-contactor 120 based on the measured values and code adapted to determine the amount of any catalyst component 102, 104, 106, 108 to bypass the pre-contactor 120. The codes used in embodiments of the present invention can include separate codes for each task, such as for controlling a concentration of a catalyst component in a mixture in a pre-contactor to form a polyolefin in a polymerization reactor. Alternatively, the codes can be combined into a single code that contains all of the tasks; or alternatively, subsets of codes containing one or more of the codes described herein. Examples of code that can be used to perform the tasks described herein can include computer programs, machine-readable instructions, and the like. Suitable types of codes will be apparent to those of skill in the art and are to be considered within the scope of the present invention.

Those skilled in the art will appreciate that certain modifications can be made to the invention herein disclosed with respect to the illustrated aspects of the invention, without departing from the scope of the invention. And while the invention has been described above with respect to the aspects of the invention, it will be understood that the invention is adapted to numerous rearrangements, modifications, and alterations, all such arrangements, modifications, and alterations are intended to be within the scope of the appended claims.

The invention claimed is:

1. A system for introduction of multiple components into a polymerization system, comprising:
    a polymerization catalyst component;
    an activator compound component;
    a co-catalyst component;
    a diluent;
    means for adding the polymerization catalyst component into the polymerization system at a controlled rate;
    means for adding the activator compound component into the polymerization system at a controlled rate;
    means for adding the co-catalyst component into the polymerization system at a controlled rate;
    means for adding the diluent into the polymerization system at a controlled rate;
    means for introducing the polymerization catalyst component, the activator compound component, the co-catalyst component, and the diluent into a pre-contactor;
    means for agitating the polymerization catalyst component, the activator compound component, the co-catalyst component, and the diluent in the pre-contactor;
    means for directing output from the pre-contactor to a polymerization reactor; and
    wherein the pre-contactor is configured to receive a first portion of the activator compound component, and the polymerization reactor is configured to receive a second portion of the activator compound component, wherein the second portion was not sent to the pre-contactor.

2. The system of claim 1,
    wherein the means for adding the polymerization catalyst component into the polymerization system at a controlled rate further comprises: means for selecting a desired flow rate for the polymerization catalyst component; means for conveying the polymerization catalyst component into the polymerization system at an actual flow rate; means for measuring the actual flow rate for the polymerization catalyst component; and means for adjusting the actual flow rate for the polymerization catalyst component to substantially equal the desired flow rate for the polymerization catalyst component;
    wherein the means for adding the activator compound component into the polymerization system at a controlled rate further comprises: means for selecting a desired flow rate for the activator compound component; means for conveying the activator compound component into the polymerization system at an actual flow rate; means for measuring the actual flow rate for the activator compound component; and means for adjusting the actual flow rate for the activator compound component to substantially equal the desired flow rate for the activator compound component; and
    wherein the means for adding the co-catalyst component into the polymerization system at a controlled rate further comprises: means for selecting a desired flow rate for the co-catalyst component; means for conveying the co-catalyst component into the polymerization system at an actual flow rate; means for measuring the actual flow rate for the co-catalyst component; and means for adjusting the actual flow rate for the co-catalyst component to substantially equal the desired flow rate for the co-catalyst component.

3. The system of claim 1, comprising a means for introducing a portion of one or more of the polymerization catalyst component, the activator compound component, the co-catalyst component into the pre-contactor; and a means for directing a remaining portion of one or more of the polymerization catalyst component, the activator compound component, or the co-catalyst component to the polymerization reactor.

4. The system of claim 1, wherein the pre-contactor is configured to receive a portion of the polymerization catalyst component, the co-catalyst component, and the diluent, and wherein the polymerization reactor is configured to receive a remaining portion of one or more of the polymerization catalyst component or the co-catalyst component that were not sent to the pre-contactor.

5. A polymerization system configured to receive multiple components comprising:
    a polymerization catalyst addition system storing a polymerization catalyst component and configured to add the polymerization catalyst component to the polymerization system at a controlled rate;
    an activator compound addition system storing an activator compound component and configured to add the activator compound component to the polymerization system at a controlled rate;
    a co-catalyst addition system storing a co-catalyst component and configured to add the co-catalyst component to the polymerization system at a controlled rate;
    a pre-contactor configured to receive a first portion of the activator compound component and a portion of one or more of the polymerization catalyst component or the co-catalyst component; and
    a first polymerization reactor configured to receive output from the pre-contactor, wherein the first polymerization reactor is further configured to receive a remaining portion of one or more of the polymerization catalyst component or the co-catalyst component that were not sent to the pre-contactor, and wherein the first polymerization reactor is configured to receive a second portion of the activator compound component, wherein the second portion was not sent to the pre-contactor.

6. The system of claim 5, wherein each of the polymerization catalyst addition system, the activator compound addition system, and the co-catalyst addition system comprises equipment that is selected from the group consisting of a mass flow meter, a pump, a valve, and combinations thereof.

7. The system of claim 5, wherein the first polymerization reactor is a CSTR, a slurry loop reactor, a batch reactor, a gas phase reactor, an autoclave reactor, a tubular reactor, a multi-zone reactor, a fluidized bed reactor, a fixed bed reactor, a stirred bed reactor, a stirred fluidized bed reactor, or combinations thereof.

8. The system of claim 5, wherein the polymerization system comprises a second polymerization reactor and wherein the first and second polymerization reactors are arranged in a series or a parallel configuration.

9. The system of claim 5, wherein the polymerization catalyst component comprises a polymerization metallocene solution component.

10. The system of claim 5, wherein the activator compound component comprises a treated solid oxide compound component.

11. The system of claim 5, wherein the co-catalyst component comprises an aluminum alkyl component.

12. The polymerization system of claim 5, wherein the pre-contactor is configured for plug flow and wherein the first portion and the portion of one or more of the polymerization catalyst component or the co-catalyst component are added at an entrance of the pre-contactor and the first portion and the portion of one or more of the or the co-catalyst component are added downstream of the entrance of the pre-contactor.

13. The polymerization system of claim 5, wherein the polymerization catalyst component comprises between one and six catalyst components.

14. The polymerization system of claim 13, comprising two polymerization catalyst components including a metallocene solution.

15. The system of claim 5, wherein the pre-contactor comprises a vessel.

16. The system of claim 15, wherein the vessel comprises a CSTR that includes an agitator.

17. The system of claim 5, wherein the pre-contactor comprises a heating jacket configured to heat the first portion and the portion of the one or more of the polymerization catalyst component or the co-catalyst component.

18. The system of claim 5, comprising a diluent addition system storing a diluent and configured to add the diluent to the polymerization system at a controlled rate, wherein the pre-contactor is configured to receive the first portion, the portion of the one or more of the polymerization catalyst component or the co-catalyst component, and the diluent.

19. The system of claim 18, wherein the diluent comprises propane, isobutane, pentane, hexane, heptane, octane, or a combination thereof.

20. The system of claim 18, wherein the diluent addition system comprises equipment that is selected from the group consisting of a mass flow meter, a pump, a valve, and combinations thereof to control a residence time of the pre-contactor.

21. The system of claim 5, comprising a feedback controller configured to measure properties of a polymer produced in the first polymerization reactor and adjust the controlled rate of the polymerization catalyst component, the controlled rate of the activator compound component, or the controlled rate of the co-catalyst component.

22. A polymerization system configured to receive multiple components comprising:
a polymerization catalyst addition system storing a polymerization catalyst component and configured to add the polymerization catalyst component to the polymerization system at a controlled rate;
an activator compound addition system storing an activator compound component and configured to add the activator compound component to the polymerization system at a controlled rate;
a co-catalyst addition system storing a co-catalyst component and configured to add the co-catalyst component to the polymerization system at a controlled rate;
a diluent addition system storing a diluent and configured to add the diluent to the polymerization system at a controlled rate;
a pre-contactor configured to receive the polymerization catalyst component, a first portion of the activator compound component, the co-catalyst component, and the diluent, wherein the pre-contactor comprises a CSTR that includes an agitator; and
a first polymerization reactor configured to receive output from the pre-contactor, wherein the first polymerization reactor is configured to receive a second portion of the activator compound component, wherein the second portion was not sent to the pre-contactor.

23. The system of claim 22, wherein the pre-contactor is configured to receive a portion of the polymerization catalyst component, the co-catalyst component, and the diluent, wherein the first polymerization reactor is configured to receive a remaining portion of one or more of the polymerization catalyst component or the co-catalyst component that were not sent to the pre-contactor.

* * * * *